W. M. BROOKS.
SEALING MECHANISM.
APPLICATION FILED DEC. 11, 1919.
1,380,038.
Patented May 31, 1921.
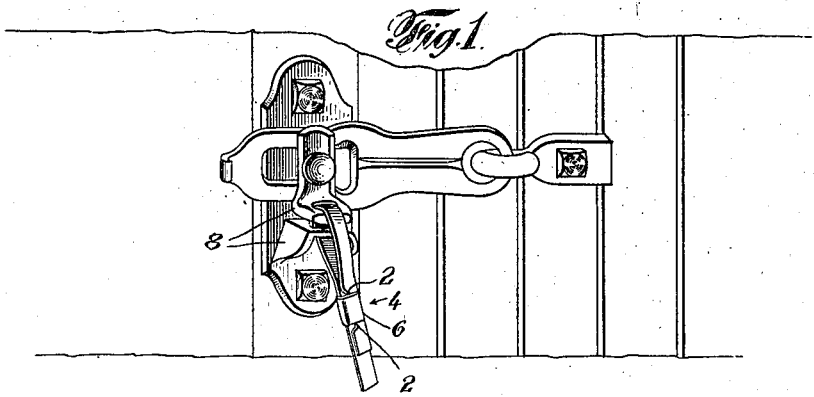
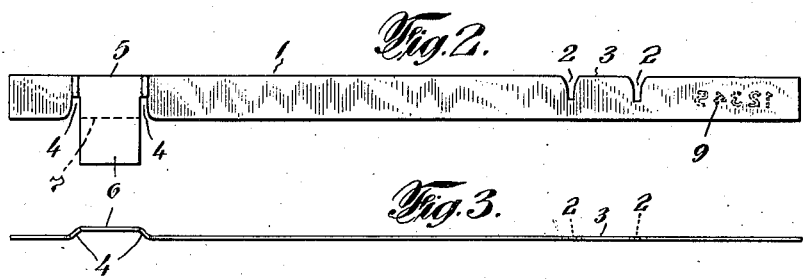
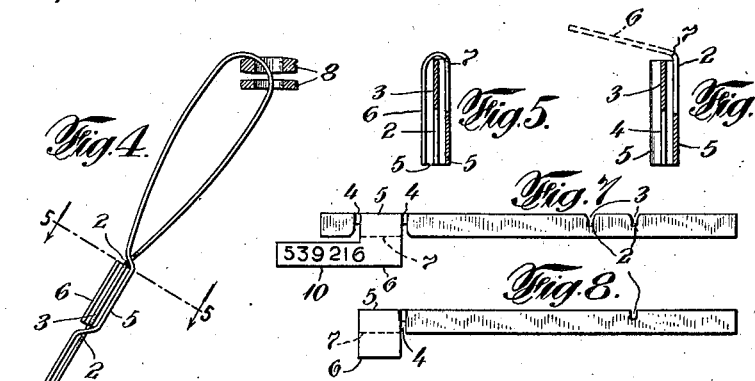
Inventor
Winfred Mudge Brooks
By his Attorney

UNITED STATES PATENT OFFICE.

WINFRED M. BROOKS, OF WEST ORANGE, NEW JERSEY.

SEALING MECHANISM.

1,380,038.　　　　　　　Specification of Letters Patent.　　Patented May 31, 1921.

Application filed December 11, 1919.　Serial No. 344,035.

*To all whom it may concern:*

Be it known that I, WINFRED M. BROOKS, a citizen of the United States, and a resident of West Orange, in the county of Essex and State of New Jersey, have invented certain new and useful Improvements in Sealing Mechanism, of which the following is a specification.

The present invention relates generally to shackle seals such as are used in connection with freight cars and has for its main object the provision of a seal that may be made entirely of sheet metal and which will furnish evidence of tampering should any unauthorized person attempt to open the seal.

To this end the invention consists of the hereinafter described features of construction. In the accompanying drawings the invention is embodied in a concrete and preferred form in which—

Figure 1 is a view of a portion of a freight car with the shackle seal of my invention in position.

Fig. 2 is a plan view of an unbent blank showing one form of shackle seal embodying the invention.

Fig. 3 is an edge view of Fig. 2.

Fig. 4 is a view partly in section looking in the direction of arrow 4 of Fig. 1.

Fig. 5 is a sectional view on the line 5—5 of Fig. 4.

Fig. 6 is a view similar to Fig. 5 showing how the metal is fractured when it is attemped to open the seal.

Fig. 7 is a plan view of a blank showing one modified form of the invention.

Fig. 8 is a plan view of a blank showing another modified form of the invention.

Fig. 9 is a plan view of a blank showing a third modified form of the invention.

Fig. 10 is a view of the blank of Fig. 9 bent up and sealed.

1 is a blank of sheet metal in strip form having near one end notches 2 in one of its longitudinal side edges. Near its other end and in the opposite longitudinal side edge of the blank are notches 4. Between notches 2 is a tongue portion 3, and between notches 4 is a recessed tongue portion 5. 6 is a telltale lug forming a continuation of tongue 5 and separated therefrom by a weakened zone 7.

In practice, the blank 1 is passed through hasp or other members 8 of the device with which the invention is to be used, after which said blank is formed into a loop, as seen best in Fig. 4, and the complementary notches 2 and 4 are interlocked by crossing the parts as shown in Fig. 4. This interlocking prevents longitudinal displacement of the two ends of the blank. The tell-tale lug 6 is now folded along the weakened line 7 over the complementary tongues and notches. An unauthorized person, desiring to open the seal, must necessarily unbend lug 6 and this causes the material to fracture along the line 7 thereby leaving evidence that the seal has been tampered with.

In the form of the invention shown in Fig. 2, the seal number, 9, is carried by the strip 1, but in Fig. 7 a tail 10 carried by lug 6 is provided with the seal number. In Fig. 8 there is only one notch 4 and one notch 2.

In Figs. 9 and 10, lug $6^a$ is not integral with the blank but is a separate member riveted on the blank. In addition said lug is provided with an opening 11 through which the interlocked notched portions are visible. This enables a person inspecting the seal to ascertain that the parts are properly interlocked and that the blank has not been cut at a point outside the seal, because if the blank is thus cut the interlocking parts would become displaced. Struck-up portions 12 are also provided in the ends of the strip. Should the blank be severed at a point outside the seal and an attempt be made to slide the severed end into the seal, said portions 12 will prevent this being done.

A characteristic feature of the invention resides in the fact that the person using the seal receives it in blank form, and the last act of sealing is the folding over of the tell-tale lug. There is no previously bent up so-called casing so common in other seals of this general character.

I claim:

1. A shackle seal blank comprising: a sheet metal strip having complementary notches formed at opposite ends and in the opposite longitudinal edges of the strip, said blank being bent back upon itself to form a loop and the free ends thereof being crossed and the notches interlocked to prevent longitudinal displacement of the two ends of the strip, and a lug projecting from one of the side edges only of the strip to be folded over the interlocked parts.

2. A shackle seal blank comprising: a sheet metal strip having complementary notches formed at opposite ends and in the opposite longitudinal edges of the strip, said blank being bent back upon itself to form a loop and the free ends thereof being crossed and the notches interlocked to prevent longitudinal displacement of the two ends of the strip, a tell-tale lug projecting from one of the side edges only of the strip to be folded over the interlocked parts, said lug having a weakened zone at the line of folding to cause fracture of the material when unbent.

3. A shackle seal blank comprising: a sheet metal strip having complementary notches formed at opposite ends and in the opposite longitudinal edges of the strip, said blank being bent back upon itself to form a loop and the free ends thereof being crossed and the notches interlocked to prevent longitudinal displacement of the two ends of the strip, a tell-tale lug projecting from one of the side edges only of the strip to be folded over the interlocked parts, said lug having a weakened zone at the line of folding to cause fracture of the material when unbent, and said lug having an opening to render the interlocked notches visible.

4. A shackle seal blank comprising: a sheet metal strip having complementary notches formed at opposite ends and in the opposite longitudinal edges of the strip, said blank being bent back upon itself to form a loop and the free ends thereof being crossed and the notches interlocked to prevent longitudinal displacement of the two ends of the strip, a tell-tale lug projecting from one of the side edges only of the strip to be folded over the interlocked parts, said lug having a weakened zone at the line of folding to cause fracture of the material when unbent and said lug having an opening to render the interlocked notches visible, and struck-up portions adjacent the ends of the strip.

Signed at New York, in the county of New York and State of New York, this 9th day of Dec., 1919.

WINFRED M. BROOKS.